May 26, 1964    P. KAPTEYN ETAL    3,134,547
ELECTRONIC FLASH UNIT FOR PHOTOGRAPHIC PURPOSES
Filed Oct. 24, 1960    4 Sheets-Sheet 1
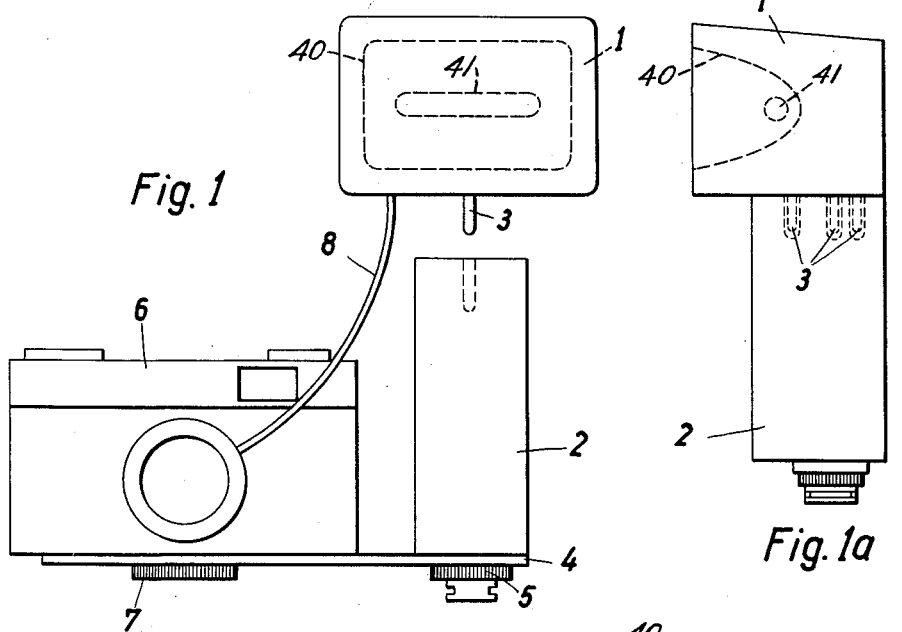
*Fig. 1*
*Fig. 1a*
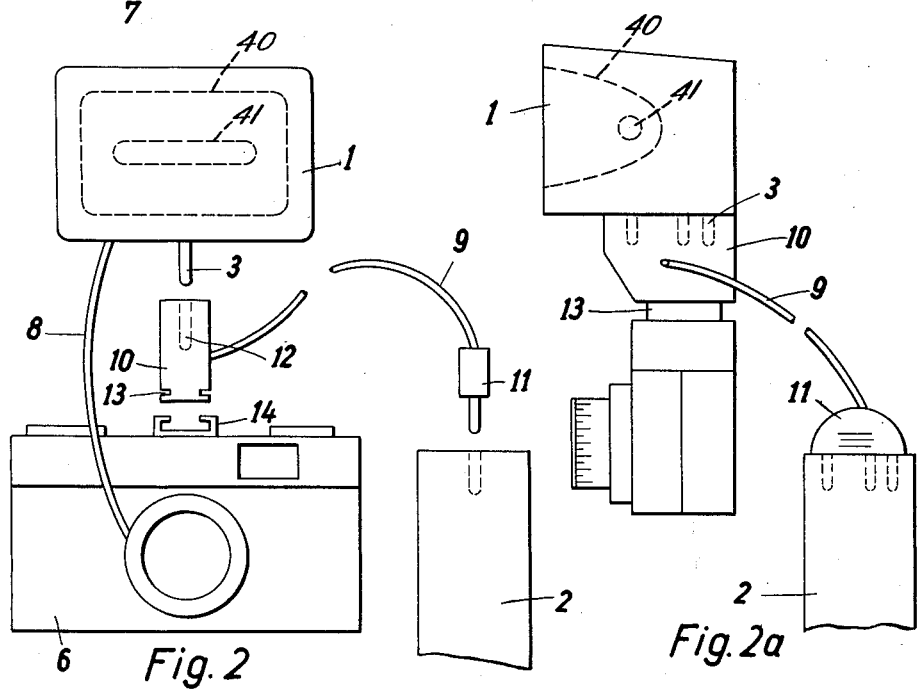
*Fig. 2*
*Fig. 2a*
Inventors:
Paul Kapteyn
Walter Junid May 26, 1964     P. KAPTEYN ETAL     3,134,547
ELECTRONIC FLASH UNIT FOR PHOTOGRAPHIC PURPOSES
Filed Oct. 24, 1960     4 Sheets-Sheet 3

United States Patent Office 3,134,547
Patented May 26, 1964

3,134,547
ELECTRONIC FLASH UNIT FOR PHOTOGRAPHIC PURPOSES
Paul Kapteyn and Walter Schmidt, Berlin-Lichterfelde, Germany, assignors to Loewe Opta Aktiengesellschaft, Berlin, Germany, a company of Germany
Filed Oct. 24, 1960, Ser. No. 64,659
Claims priority, application Germany Oct. 30, 1959
2 Claims. (Cl. 240—1.3)

The invention relates to an advantageous form of electronic flash units for photographic purposes. It is the object of the invention to realize in a simple way various possibilities for arranging an electronic flash unit in relation to the camera.

The use of two parts, preferably connected by an expanding cable, in electronic flash units one part of which contains the battery and the ignition or storage condenser and the other of which contains the reflector and the remaining circuit components is already known.

It is an object of this invention to realize electronic flash units, both parts of which can be composed to form one part by a plug connection, or selectively, instead of this direct plug connection, can be connected by means of a separate connection part insertable between both parts and supplied with an insertion shoe for mounting to the camera, further supplied with plug sockets suitable for connection with the plug pins attached to the reflector part, and further supplied with a cable carrying at its free end plug pins suitable for connecting said cable with the casing part separated from the reflector part.

The invention makes possible that the unit can, firstly, be joined together to form one whole via a direct plug-in connection and attachable to the camera or, secondly, can be used in such a manner that the reflector part is attached to the camera by means of a plug socket part having a connection cable for connecting the separate casing part to said reflector part.

The construction according to the invention allows for various operational forms of the electronic flash unit. On the one hand, the two parts of the electronic flash unit joined to form one whole by means of the direct plug connection, consisting of the battery-condenser part and the reflector part containing the remaining circuit components can be attached to the camera by means of a rail in the known manner. On the other hand, an operational form can be constructed with the reflector part and its plug contacts fitting in the plug socket part connector cable and mounted together with this in the insertion fitment of the camera or on a mounting rail to be connected to the camera, whilst the free end of the cable connection with its plug part at its free end forms the plug connection to the battery-condenser part.

Moreover, another operational form is possible with the two parts of the electronic flash unit joined to form one whole by means of the direct plug connection, consisting of the battery-condenser or casing part and the reflector part containing the remaining circuit elements sliding as a whole into the insertion fitment of the camera.

Accordingly, by means of the invention, it is possible to use the electronic flash unit as a whole or the two parts of this unit separately in various combinations on the camera itself or on a rail attached to the camera. It is also possible to connect the electronic flash unit so as to form a whole without the use of the connecting cable between its two parts by means of direct plug connection.

Further details concerning the invention are given by means of the examples shown in the accompanying drawing, wherein—

FIGS. 1 and 1a show the electronic flash unit plugged together to form a whole, capable of being operated at the side near the camera via a mounting rail; FIG. 1 shows the front view and FIG. 1a the side view.

FIGS. 2 and 2a show the possibility of combining the two parts of the electronic flash to the camera using the separate connection part with the connector cable; FIG. 2 shows the front view and FIG. 2a the side view.

Figure 3:
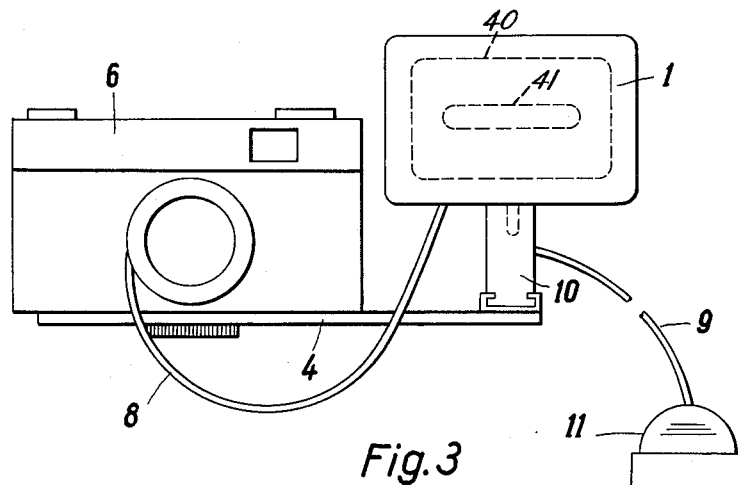
FIG. 3 represents another exemplary embodiment of the electronic flash unit with only the reflector part containing the corresponding circuit components fitted at the side near the camera on a mounting rail and the battery-condenser or casing part carried as desired, for example, around the neck of the user.

In FIG. 1, the reflector part 1 can be joined to the battery-condenser part 2 via the plug pins 3 so as to form a whole, as can be seen from the side view in FIG. 1a. Here the reflector part 1 contains the remaining circuit elements as well as the reflector 40 enclosing the electronic flash lamp 41. By means of the mounting rail 4 and the screw 5, the battery-condenser or casing part 2 of the unit can be connected mechanically to the camera 6 in the known manner by means of the screw 7. 8 is the ignition cable leading to the synchronised connection of the camera. In this case, the electronic flash unit is therefore joined to form one whole by means of a plug connection and is ready for operation at the side of the camera. In FIGS. 2 and 2a, the same parts are given the same reference numerals, that is, the reflector part is again 1, the battery-condenser or casing part 2 and the camera in use 6. 9 is the connecting cable between these parts 1 and 2 which, according to the invention, has at its free end a connection part 10 shaped as an insertion part and at the other end is formed as a plug 11 which can be plugged into the battery-condenser or casing part 2. By means of the plug connection 3, the reflector part 1 can be plugged into the corresponding plug socket 12, and likewise part 10 can be pushed into the insertion member 14 on the camera 6 by means of a corresponding construction on its foot 13, thus forming a mechanical connection to the camera. In this case, only the reflector part is attached to the camera and the battery-condenser part 2 can, for example, be hung around the neck or put into the pocket of the user.

In the example shown in FIG. 3, the reflector part 1 is not attached to the camera as in FIG. 2 but is fastened to the mounting rail 4 by means of the connection part 10 fixed to said rail by means of insertion means beside the camera 6. The battery-condenser or casing part 2 is again connected electrically to this part 10 by means of the plug 11 via the connecting cable 9.

Figure 4:
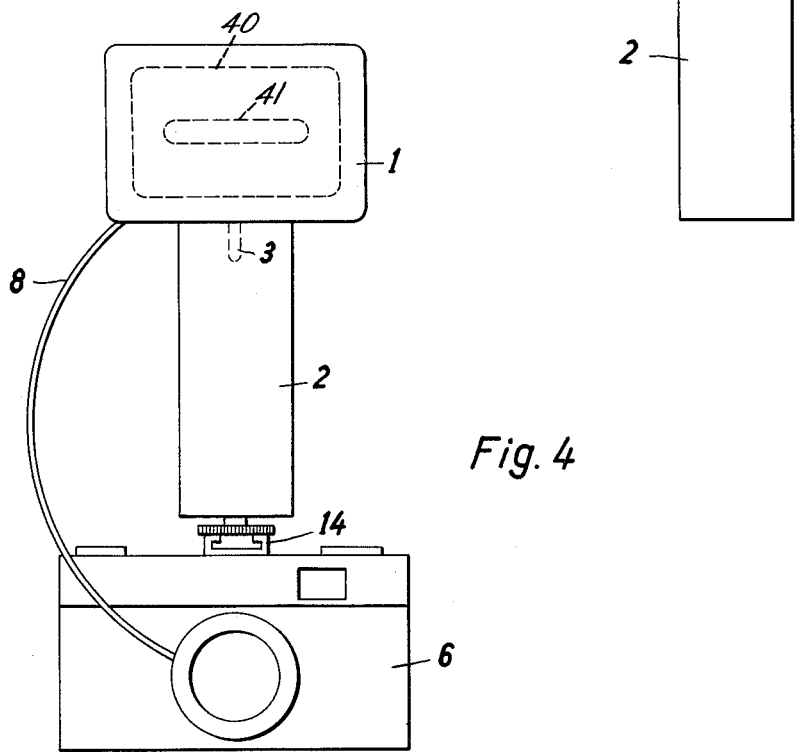
FIG. 4 shows the electronic flash unit plugged together to form a whole pushed into the insertion fitment of the camera so that the electronic flash unit is arranged as a whole on top of the camera.

FIG. 4 shows another example with parts 1 and 2— joined to form a whole by means of the plug connection 3—plugged into the insertion shoe 14 of the camera 6. In this case, the source of light in the reflector part 1 is arranged considerably above the camera 6. The synchronising cable is again marked with 8.

Figure 5:
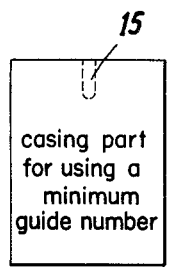
FIGS. 5, 6 and 7 show various structural types for the battery-condenser or casing part which can be interchanged in order to obtain higher light power (high guide numbers).
Figure 6:
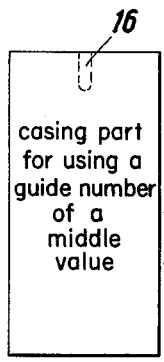
Figure 7:
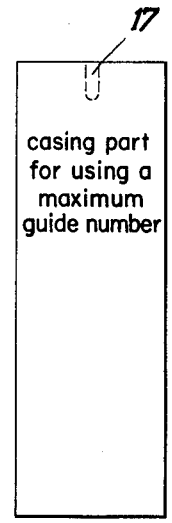

In FIGS. 5, 6, and 7, battery-condenser or casing parts of varying sizes are shown for producing various guide numbers representing various flash light powers, and these parts can be interchanged as desired with the battery-condenser or casing part 2 shown in the previous figures. For example, the unit shown in FIG. 5 is so dimensioned with its electrical power components contained therein that it produces a light power corresponding with a minimum guide number, that shown in FIG. 6 is so dimensioned that it produces a light power corresponding with a guide number of middle value, and finally that shown in FIG. 7 corresponds with a maximum guide number. The electrical power components in these various units are dimensioned so that these containers of varying sizes can be connected to the corresponding reflector part 1 and to the cable 9 respectively via the plug sockets 15 and 16, 17 respectively (see FIGS. 1 to 3) for effecting various outputs and guide numbers respectively. Finally, the circuit system used for the various battery-condenser or casing parts is so chosen that the charging period is not longer with larger units but is the same as with the smallest connection unit. For this purpose, the batteries are connected in series and the ignition or storage condensers in parallel. The series connection of the batteries is necessary in order to maintain the short charging period. And here the condenser can in both cases have, for example, either comparable capacity values but varyingly high permissible maximum voltage or various capacity values with the same permissible maximum voltage. In the latter case, a regulating device is provided to prevent the maximum voltage from being exceeded.

Figure 8:
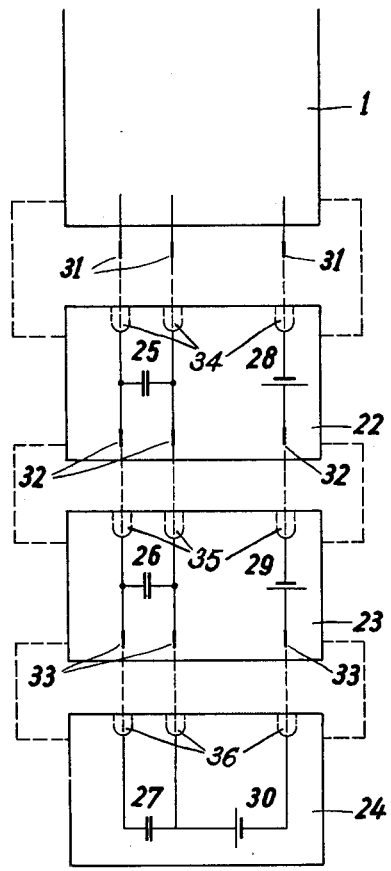
FIG. 8 shows another example for constructing the battery-condenser part by plugging together a plurality of casings containing single storage condensers and batteries given schematically.

Finally, FIG. 8 shows a further embodiment in which the increase in the output of the electronic flash unit is achieved by additionally connecting together several battery-condenser or casing parts 22, 23, and 24 and the reflector part 1 respectively. In this instance, 25, 26, and 27 are the storage condensers and 28, 29, and 30 the batteries. By means of the plug pins 31, 32, and 33, the various units may be plugged together making use of the corresponding sockets 34, 35, and 36 in the other parts 22, 23, and 24 to be connected. It can be seen that the storage condensers 25 to 27 are connected in parallel and the corresponding batteries 28 to 30 in series. Accordingly, the additional parts 23 and 24 plugged into each other, the charging time is not increased but remains constant just as when the component 22 is connected alone, the light power, however, is increased.

It must be pointed out that in the example shown in FIG. 8, the plug pins 31 to 33 must be arranged in a recess of the casing in order to avoid the danger of contact.

In addition, it must be mentioned that, with the use of part 22 alone, a light power according to a minimum guide number can be obtained; on plugging in the unit 23, a light power according to a guide number of middle value and finally on additional use of part 24, i.e. simultaneous use of all three units 22 to 24, the highest light power according to a maximum guide number will be attained.

What we claim is:
1. In an electronic flash unit for photographic purposes usable in connection with a camera comprising a reflector part with electrical plug pins attached thereto, an electronic flash lamp mounted within said reflector part and electrically connected to said electrical plug pins, a casing part containing electrical power components, electrical socket means at one end of said casing part electrically connected to said power components, a separate connection part, said connection part being supplied with socket means at one end thereof removably electrically connected to said reflector part plug pins, and having camera mounting means at the other end, said connection part being further supplied with a connection cable in circuit with said connection part socket means and carrying at its free end plug pins removably connected to said casing part socket means.

2. In an electronic flash unit for photographic purposes usable in connection with a camera comprising a reflector part with electrical plug pins attached thereto, an electronic flash lamp mounted within said reflector part and electrically connected to said electrical plug pins, a casing part containing electrical power components, electrical socket means at one end of said casing part electrically connected to said power components, a separate connection part, said connection part being supplied with socket means at one end thereof removably electrically connected to said reflector part plug pins, and having camera mounting means at the other end, said connection part being further supplied with a connection cable in circuit with said connection part socket means and carrying at its free end plug pins removably connected to said casing part socket means, said casing part consisting of a plurality of casings having electrical power components therein connected together mechanically and electrically by plug-in connection means.

References Cited in the file of this patent
UNITED STATES PATENTS

| | | |
|---|---|---|
| 2,244,114 | Noir | June 3, 1941 |
| 2,314,829 | Hunter | Mar. 23, 1943 |
| 2,320,222 | Crupi | May 25, 1943 |
| 2,509,809 | Cook | May 30, 1950 |
| 2,597,073 | Cunningham | May 20, 1952 |
| 2,622,188 | Seeger et al. | Dec. 16, 1952 |
| 2,644,381 | Mendelsohn | July 7, 1953 |
| 2,682,603 | Dine et al. | June 29, 1954 |
| 2,721,929 | Schwartz et al. | Oct. 25, 1955 |
| 2,740,339 | Carter | Apr. 3, 1956 |
| 2,789,205 | Schwartz et al. | Apr. 16, 1957 |
| 2,844,081 | Wagner et al. | July 22, 1958 |
| 2,969,721 | Casselman et al. | Jan. 31, 1961 |
| 3,018,707 | Whittier | Jan. 30, 1962 |

FOREIGN PATENTS

| | | |
|---|---|---|
| 952,399 | Germany | Nov. 15, 1956 |